US009536723B1

(12) United States Patent
Bertsch et al.

(10) Patent No.: US 9,536,723 B1
(45) Date of Patent: Jan. 3, 2017

(54) THIN FIELD TERMINATOR FOR LINEAR QUADRUPOLE ION GUIDES, AND RELATED SYSTEMS AND METHODS

(71) Applicant: Agilent Technologies, Inc., Santa Clara, CA (US)

(72) Inventors: James L. Bertsch, Santa Clara, CA (US); Kenneth R. Newton, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/615,889

(22) Filed: Feb. 6, 2015

(51) Int. Cl.

| | |
|---|---|
| ***H01J 49/42*** | (2006.01) |
| ***H01J 49/00*** | (2006.01) |
| ***B01D 59/44*** | (2006.01) |
| ***H01J 49/06*** | (2006.01) |
| ***H01J 49/26*** | (2006.01) |

(52) U.S. Cl.
CPC ............ *H01J 49/063* (2013.01); *H01J 49/067* (2013.01); *H01J 49/26* (2013.01)

(58) Field of Classification Search
USPC ............ 250/396 R, 281, 282, 293, 288, 290, 292,250/526
See application file for complete search history.

(56) References Cited

U.S. PATENT DOCUMENTS

| | | | | |
|---|---|---|---|---|
| 3,129,327 A | | 4/1964 | Brubaker | |
| 3,371,204 A | | 2/1968 | Brubaker | |
| 3,413,463 A | | 11/1968 | Brubaker | |
| 5,153,880 A | | 10/1992 | Owen et al. | |
| 5,847,385 A | * | 12/1998 | Dresch | H01J 49/025 250/283 |
| 6,153,880 A | * | 11/2000 | Russ, IV | H01J 49/4215 250/292 |
| 6,403,952 B2 | | 6/2002 | Whitehouse et al. | |
| 6,730,904 B1 | * | 5/2004 | Wells | H01J 49/062 250/288 |
| 6,744,043 B2 | * | 6/2004 | Loboda | G01N 27/622 250/282 |
| 6,753,523 B1 | * | 6/2004 | Whitehouse et al. | H01J 49/005 250/292 |
| 6,872,938 B2 | * | 3/2005 | Makarov | B82Y 30/00 250/281 |
| 6,987,264 B1 | * | 1/2006 | Whitehouse | H01J 49/004 250/292 |
| 7,189,967 B1 | * | 3/2007 | Whitehouse | H01J 49/004 250/292 |

(Continued)

FOREIGN PATENT DOCUMENTS

WO 2007079588 A1 7/2007

OTHER PUBLICATIONS

International Search Report and Written Opinion dated May 20, 2016 from related International Application No. PCT/ US2016/ 016815.

*Primary Examiner* — Bernard Souw

(57) ABSTRACT

A field terminator includes a plurality of electrode plates positioned around a guide axis at a radial distance therefrom. The plates generate a quadrupole DC field such that a polarity on each plate is opposite to a polarity on the plates adjacent thereto. The plates may be positioned at an axial end of a quadrupole ion guide such as a mass filter. In addition to an RF field, the ion guide may generate a quadrupole DC field. The DC field of the plates may be opposite in polarity to that of the ion guide.

20 Claims, 7 Drawing Sheets

(56) References Cited

U.S. PATENT DOCUMENTS

| | | | | |
|---|---|---|---|---|
| 7,309,861 | B2 * | 12/2007 | Brown | H01J 49/062 250/281 |
| 7,329,866 | B2 * | 2/2008 | Wang | H01J 49/424 250/290 |
| 7,893,407 | B2 | 2/2011 | Syms | |
| 8,258,470 | B2 * | 9/2012 | Sheehan | H01J 49/067 250/292 |
| 2002/0005480 | A1 * | 1/2002 | Harada | H01J 49/4215 250/288 |
| 2008/0185518 | A1 * | 8/2008 | Syms | H01J 49/0018 250/296 |
| 2011/0215235 | A1 | 9/2011 | Schoen et al. | |
| 2014/0131571 | A1 * | 5/2014 | Shimomura | H01J 49/0045 250/288 |

* cited by examiner

THIN FIELD TERMINATOR FOR LINEAR QUADRUPOLE ION GUIDES, AND RELATED SYSTEMS AND METHODS

TECHNICAL FIELD

The present invention relates to field terminators, or ion lens elements, which may be positioned at one or both axial ends of a linear quadrupole ion guide, such as a mass filter or linear ion trap, as may be utilized in mass spectrometry (MS). The invention also relates to ion guide assemblies and spectrometers providing such field terminators, and to methods utilizing field terminators.

BACKGROUND

Mass spectrometry (MS) is an analytical technique utilized to produce spectra of the mass-to-charge ratios (or m/z values, or more simply "masses") of ions produced from molecules of a sample of interest. The obtained spectra of masses are utilized to identify the molecules in the sample by correlating the measured masses with the known masses of ions associated with specific molecules. In a typical MS instrument, a sample is ionized and the produced ions are subsequently separated in a mass analyzer according to their mass-to-charge ratio. The ions are detected by an ion detector, and the signal derived from the output of the ion detector is displayed as a spectrum of the relative abundance of ions as a function of their mass-to-charge ratios.

Tandem mass spectrometry (MS-MS) utilizes multiple stages of mass spectrometry, which are usually separated by some form of ion fragmentation device such as a collision cell. MS-MS is particularly useful when the sample to be analyzed is a complex mixture of many distinct molecular species. MS-MS can be utilized to produce structural information about a compound by fragmenting specific ions inside the mass spectrometer and identifying the resulting fragment ions. This information can then be pieced together to generate structural information about the intact molecule. A typical tandem mass spectrometer has two mass analyzers separated by a collision cell into which an inert gas (e.g., argon, nitrogen) is admitted to collide with the selected sample of ions, causing the desired fragmentation. The first mass analyzer stage is used to select an ion mass or range of ion masses ("precursor" or "parent" ions) to transmit to the collision cell for fragmentation. The collision cell produced fragment ions ("product" or "daughter" ions) from the precursor ions, and transmits the fragment ions to the second mass analyzer stage. The second mass analyzer stage then sorts the fragment ions by mass and transmits them to the ion detector. Typically, the first mass analyzer stage transmits only a limited number of molecular species so that after fragmentation the resulting mass spectrum of product ions is simple enough that the mass peaks of the fragment ions can be identified with the correct precursor ion.

The mass analyzer(s) utilized in an MS or MS-MS instrument is often configured as a linear quadrupole ion guide. A linear quadrupole ion guide consists of a set of four parallel rod-shaped electrodes positioned at a radial distance from a central axis (i.e., the main optical axis of ion transmission), and spaced around the central axis so as to surround an axially elongated ion guide volume leading from an ion entrance end to an axially opposite ion exit end. To implement mass analysis or mass filtering, both radio frequency (RF) potentials and direct current (DC) potentials are applied to the ion guide electrodes so as to generate a composite RF/DC electric field effective for limiting the motions of ions of selected masses in directions radial to the central axis. Under the constraints imposed by this ion confining field, ions transmitted through the entrance end travel through the ion guide volume in complex trajectories around the central axis and generally in the resultant direction of the exit end. However, the operating parameters of the RF/DC field are set so as to impose mass-dependent stability limits on the motions of ions in the ion guide volume. The result is that only ions of selected masses (typically a single mass or narrow mass range) are able to travel through the entire axial length of the ion guide in stable trajectories focused along the central axis, and thereby pass through the exit end. On the other hand, ions of other (non-selected) masses have unstable trajectories. The amplitude of the radial oscillations of unstable ions grows as they travel through the quadrupole until they are no longer able to be contained by the ion confining field. Consequently, these non-selected, unstable ions are removed from the ion guide volume and do not reach the exit end of the ion guide.

The strength of the electric fields is ideally net zero on the central axis of the quadrupole ion guide. Thus, quadrupole transmission is well defined for ions that enter or exit the quadrupole field very close to the central axis, or that have a very narrow range of transverse offset relative to the instantaneous RF phase at the time the ions enter or exit the quadrupole field. However, it has been known for many years that ion transmission efficiency into and out of a quadrupole is generally poor. The fringe fields at the axial ends of the finite-length quadrupole will cause the ion orbits to be unstable as they pass through the fringe field (field termination) area, especially when the parameters are tuned to pass a very narrow range of masses as in the case of a typical mass filter. The defocusing forces experienced by ions in the fringe field can be much stronger than the focusing forces provided in the quadrupole guide volume. Ions approaching the quadrupole field at too far of a distance away from the central axis, or with too much of a transverse velocity component, can be lost before having a chance to become stabilized in the quadrupole field. Ions may also be lost in a transverse direction by encountering a strong RF amplitude at a given instant of time. The more time an ion spends in the fringe field, the more likely the ion will follow an unstable path and be removed from the ion beam. Thus slower ions, i.e., higher-mass ions and ions in beams of lower average kinetic energy, tend to be more adversely affected by the fringe field than faster ions. On the other hand, transmitting ions at low kinetic energy into the quadrupole may be desirable for increasing mass resolution.

Two well-known devices have been used to alleviate the instabilities described above. One device is known as a Brubaker pre-filter or post-filter (depending on its position relative to the main quadrupole rods), which is a short section of quadrupole rods at the end of the main mass filter quadrupole with the DC field removed but carrying (most of) the RF field of the main rods. While the Brubaker lens works in a satisfactory manner in many systems, it adds some length to the overall assembly that in some cases may be undesirable. A second device is known as a Turner-Kruger lens, which has one or more cylindrical or conical lenses that extend a small length inside the quadrupole rods. This approach also is satisfactory in some systems but may have a limited transmission efficiency of ions into (or out from) the quadrupole field. In both cases, the intent is to keep the ions both close to the center of the quadrupole field while transitioning into (or out from) the quadrupole field as well as ensuring that the ion orbit remains stable in that transition zone. These devices have been used for many years and are relatively well understood.

However, it would be desirable to further improve the transmission of ions into or out from a mass filter or other linear quadrupole ion guide, and/or to shorten the length of the transition while maintaining high transmission.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, an ion guide assembly includes: a quadrupole ion guide comprising an entrance end, an exit end, and four guide electrodes elongated along a guide axis from the entrance end to the exit end and positioned at a radial distance from the guide axis; a quadrupole lens comprising four plates spaced from each other around the guide axis and positioned at an axial distance from the entrance end or the exit end, wherein each plate is axially aligned with a respective one of the guide electrodes; and a direct current (DC) voltage source configured for applying DC potentials to the guide electrodes and the plates effective for generating a DC quadrupole field in the ion guide volume and terminating the DC quadrupole field at the plates.

According to another embodiment, a method for terminating quadrupole electrical field includes: generating a quadrupole DC field in a quadrupole ion guide comprising four guide electrodes elongated along a guide axis from an entrance end to an exit end and positioned at a radial distance from the guide axis, by applying main DC potentials to the guide electrodes; and applying auxiliary DC potentials to four plates of a quadrupole lens, the plates being spaced from each other around the guide axis and positioned at an axial distance from the entrance end or the exit end, wherein each plate is axially aligned with a respective one of the guide electrodes, and wherein the auxiliary DC potentials are applied at magnitudes and polarities relative to the main DC potentials effective for terminating the quadrupole DC field at the plates.

According to another embodiment, an ion guide assembly is configured for performing any of the methods disclosed herein.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
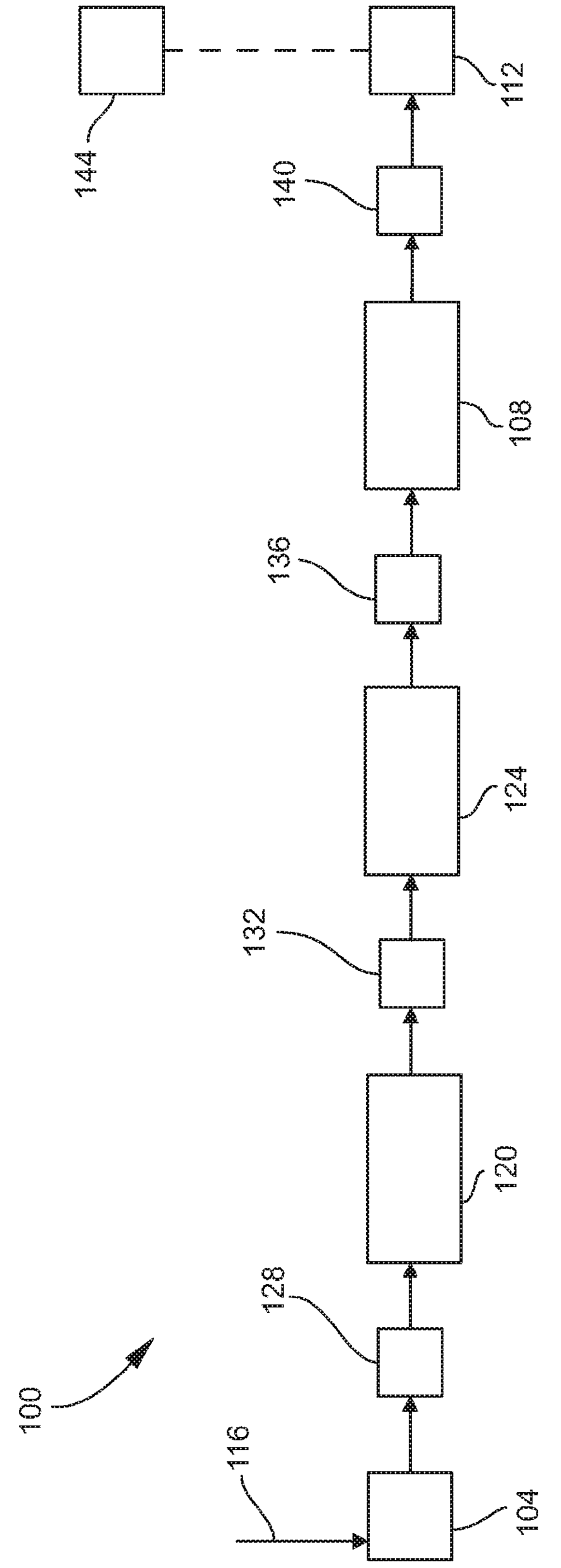
FIG. 1 is a schematic view of an example of a mass spectrometer (MS) or mass spectrometry (MS) system according to some embodiments.

FIG. 1 is a schematic view of an example of a mass spectrometer (MS) or mass spectrometry (MS) system 100 according to some embodiments, which may be utilized in the implementation of the subject matter described herein. The operation and design of various components of MS systems are generally known to persons skilled in the art and thus need not be described in detail herein. Instead, certain components are briefly described to facilitate an understanding of the subject matter presently disclosed.

According to some embodiments, the MS system 100 includes at least one quadrupole ion guide assembly. The ion guide assembly includes a quadrupole ion guide and at least one electric field terminator positioned at the ion entrance end or ion exit end of the quadrupole ion guide.

The quadrupole ion guide includes four parallel ion guide electrodes (often termed "rods") elongated along (e.g., in parallel with) an ion guide axis (e.g., the z-axis). The guide electrodes are positioned around the guide axis at a radial distance $R_0$ therefrom, thus surrounding an ion guide volume that is likewise elongated along the guide axis. The guide electrodes are spaced from each other in the transverse plane (e.g., x-y plane) orthogonal to the guide axis. This type of electrode arrangement may be referred to as a linear multipole geometry. Typically, the guide axis is a central axis of symmetry of the spatial arrangement of the guide electrodes in the transverse plane, and the guide electrodes may be said to be circumferentially spaced about the guide axis and to inscribe a cylindrical guide volume of circular cross-section. The guide electrodes extend along the guide axis between two opposing axial ends, one serving as an ion entrance end and the other serving as an ion exit end.

The quadrupole ion guide is configured to generate a quadrupole radio frequency (RF) electric field or composite quadrupole radio frequency/direct current (RF/DC) electric field in the guide volume. This field is a two-dimensional ion confining field, in that it constrains ion motion in the radial directions (transverse plane). Ions that are stable in the ion confining field are focused as a beam in the vicinity of the guide axis and are able to traverse the full axial length of the ion guide and pass through the ion exit end. On the other hand, ions that are unstable in the ion confining field are lost due to overcoming the ion confining field and impacting the guide electrodes. The parameters of the ion confining field may be set such that the quadrupole ion guide is mass-selective, whereby ions of a selected mass-to-charge (m/z) ratio or range of m/z ratios are stable while other ions are unstable. Examples of mass-selective quadrupole ion guides include mass filters and linear (two-dimensional) ion traps.

The field terminator is an ion lens or ion lens assembly, i.e., the field terminator includes one or more lens elements positioned on the guide axis. The field terminator is positioned outside the ion guide volume, at a small axial distance from the ion entrance end or the ion exit end. In some embodiments the ion guide assembly includes two field terminators, one positioned outside the ion entrance end and the other positioned outside the ion exit end. As described further below, the field terminator is configured for terminating, or at least substantially reducing the strength of, the quadrupole DC field generated in the guide volume of the quadrupole ion guide (or both the quadrupole DC field and the RF field) at the axial entrance or exit end where the field terminator is located. In the context of the present disclosure, the term "terminating" encompasses the phrase "substantially reducing the strength of" to recognize that the strength of the DC field may be reduced to a small, non-zero level that nonetheless is effective for improving ion transmission into or out from the quadrupole ion guide. In some embodiments the quadrupole ion guide is configured as a mass filter, in which case the field terminator may be characterized as a pre-filter or post-filter depending on its position. Examples of the quadrupole ion guide and the field terminator are described below.

As illustrated in FIG. 1, the MS system 100 may generally include, in order of ion process flow, an ion source 104, at least one mass analyzer 108 downstream from the ion source 104, and an ion detector 112 positioned to receive ions from the mass analyzer 108. From the perspective of FIG. 1, the MS system 100 defines a flow path for ions and gas molecules successively through the foregoing devices generally in the direction from left to right, as depicted by horizontal arrows. The MS system 100 also includes a vacuum system (not shown) for maintaining various interior regions of the MS system 100 at controlled, sub-atmospheric pressure levels. As appreciated by persons skilled in the art, the vacuum system may include vacuum lines communicating with the various interior regions via vacuum ports or exhaust ports, one or more vacuum-generating pumps, and associated components. The vacuum lines may also remove non-analytical neutral molecules from the ion path of the MS system 100. For simplicity, additional ion processing devices, ion optics, electronics, and other hardware that may be included in the MS system 100 are not shown. For example, in some embodiments the MS system 100 may include an ion mobility analyzing stage as appreciated by persons skilled in the art.

The ion source 104 may be any type of continuous-beam or pulsed ion source suitable for producing analyte ions for spectrometry, as appreciated by persons skilled in the art. Depending on the type of ionization implemented, the ion source 104 may operate at vacuum, or at or near atmospheric pressure. Examples of ion sources include, but are not limited to, electron ionization (EI) sources, chemical ionization (CI) sources, photo-ionization (PI) sources, electrospray ionization (ESI) sources, atmospheric pressure chemical ionization (APCI) sources, atmospheric pressure photoionization (APPI) sources, field ionization (FI) sources, plasma or corona discharge sources, laser desorption ionization (LDI) sources, and matrix-assisted laser desorption ionization (MALDI) sources. Sample material to be analyzed may be introduced to the ion source 104 by any suitable means, including hyphenated techniques in which the sample material is an output 116 from an analytical separation instrument such as, for example, a gas chromatography (GC) or liquid chromatography (LC) instrument (not shown).

In embodiments of the present disclosure, at least one mass analyzer (e.g., the mass analyzer 108) is based on a quadrupole mass filter or linear ion trap, as described further below. The ion detector 112 may be any device configured for collecting and measuring the flux (or current) of mass-discriminated ions outputted from the mass analyzer 108. Examples of ion detectors include, but are not limited to, multi-channel detectors (e.g., micro-channel plate (MCP) detectors), electron multipliers, photomultipliers, image current detectors, and Faraday cups.

In general operation, sample molecules are introduced into the ion source 104, and the ion source 104 produces ions from the sample molecules and transmits the ions to the mass analyzer 108. The mass analyzer 108 selectively transmits the ions to the ion detector 112 on the basis of mass-to-charge (m/z) ratio, the mechanism of mass selection or filtering being dependent on the type of mass analyzer as appreciated by persons skilled in the art. The ion detector 112 receives the ions and produces ion measurement signals from which a mass spectrum of the sample is constructed.

As also illustrated in FIG. 1, in some embodiments the MS system 100 may be configured for implementing tandem MS (MS/MS). For example, the MS system 100 may be configured as a QqQ, qTOF, or QqTOF instrument. Thus, the MS system 100 may include a first mass analyzer 120 upstream of the mass analyzer 108 (the second, or final, mass analyzer in such embodiments), and an ion fragmentation device such as a collision cell 124 between the first mass analyzer 120 and the second mass analyzer 108. The first mass analyzer 120 is configured for selecting precursor ions of a specific m/z ratio or m/z ratio range and is typically, but not necessarily, configured as a quadrupole mass filter. The collision cell 124 typically includes a non-mass-resolving, RF-only ion guide enclosed in a cell. The cell is pressurized by an inert gas to a level sufficient for producing fragment ions from the precursor ions by collision-induced dissociation (CID) as appreciated by persons skilled in the art. However, a fragmentation device other than a CID-based device may be utilized such as, for example, a device configured for implementing electron capture dissociation (ECD), electron transfer dissociation (ETD), or infrared multiphoton dissociation (IRMPD). The second mass analyzer 108 then resolves the fragment ions on the basis of mass (m/z ratio) and transmits the mass-resolved fragment ions to the ion detector 112, which outputs measurement signals from which mass spectra are then produced. In tandem MS embodiments, both the first mass analyzer 120 and the second mass analyzer 108 may be based on a linear quadrupole electrode structure. Alternatively, the second mass analyzer 108 may be another type of mass analyzer such as, for example, a three-dimensional Paul trap, a time-of-flight (TOF) analyzer, an electrostatic trap (e.g. Kingdon, Knight, or ORBITRAP® trap), a static electric and/or magnetic field sector instrument, or an ion cyclotron resonance (ICR) cell (FT-ICR or FTMS, also known as a Penning trap).

As further illustrated in FIG. 1, one or more of the ion processing devices (e.g., first mass analyzer 120, collision cell 124, second mass analyzer 108, or other ion guides not specifically shown) may be preceded or succeeded by ion optics 128, 132, 136, and 140. The ion optics 128, 132, 136, and 140 may include various types of lens elements such as, for example, aperture lenses (ring electrodes centered on-axis, plate electrodes with apertures centered on-axis, split-plate or split-cylinder electrodes with open slots or gaps centered on-axis), parallel plate electrodes, multipole rod electrodes, etc. Any of the ion optics 128, 132, 136, and 140 may be or include a field terminator as described herein.

The MS system 100 may also include a computing device (or system controller) 144. The computing device 144 is schematically depicted as representing one or more modules (or units, or components) configured for controlling, monitoring and/or timing various functional aspects of the MS system 100 described above. One or more modules of the computing device 144 may be, or be embodied in, for example, a desktop computer, laptop computer, portable computer, tablet computer, handheld computer, mobile computing device, personal digital assistant (PDA), smartphone, etc. The computing device 144 may also schematically represent all voltage sources not specifically shown, as well as timing controllers, clocks, frequency/waveform generators and the like as needed for applying voltages to various components of the MS system 100. The computing device 144 may also be configured for receiving the ion detection signals from the ion detector 112 and performing tasks relating to data acquisition and signal analysis as necessary to generate chromatograms, drift spectra, and mass (m/z ratio) spectra characterizing the sample under analysis. The computing device 144 may also be configured for providing and controlling a user interface that provides screen displays of spectrometric data and other data with which a user may interact. The computing device 144 may include one or more reading devices on or in which a tangible computer-readable (machine-readable) medium may be loaded that includes instructions for performing all or part of any of the methods disclosed herein. For all such purposes, the computing device 144 may be in signal communication with various components of the MS system 100 via wired or wireless communication links (as partially represented, for example, by a dashed line between the computing device 144 and the ion detector 112). Also for these purposes, the computing device 144 may include one or more types of hardware, firmware and/or software, as well as one or more processors, memories and databases.

As noted above, the MS system 100 may include at least one quadrupole ion guide assembly that includes a quadrupole ion guide and at least one field terminator. The quadrupole ion guide may be any of the ion processing devices described above that is configured as a linear quadrupole electrode structure, and which is preceded and/or succeeded by a field terminator. As one non-limiting example, a quadrupole ion guide assembly may include the first mass analyzer 120 (e.g., a mass filter) and a preceding field terminator (pre-filter) schematically depicted as ion optics 128 and/or a succeeding field terminator (post-filter) schematically depicted as ion optics 132.

Figure 2A:
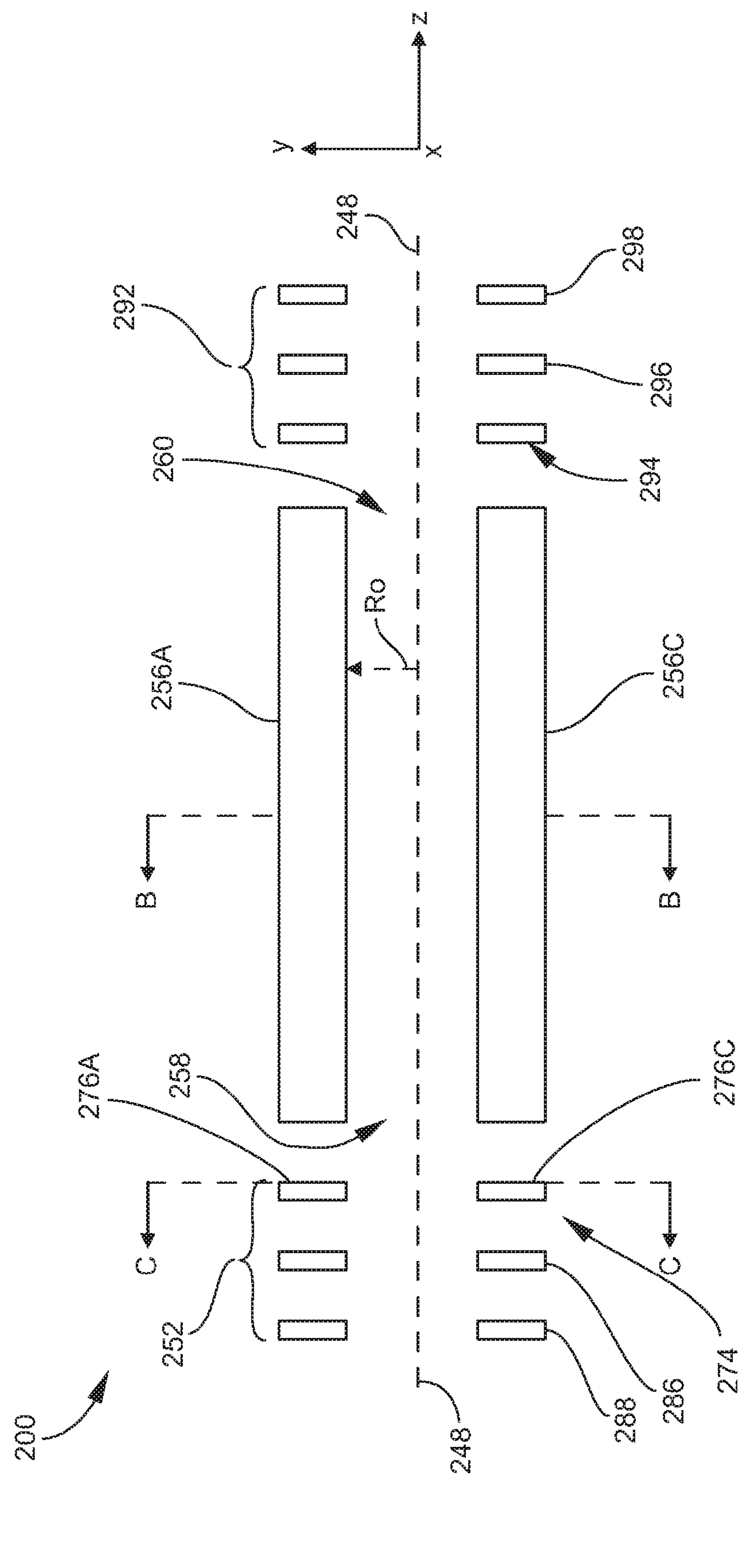
FIG. 2A is a schematic side (lengthwise) view of an example of a quadrupole ion guide assembly according to some embodiments.
Figure 2B:
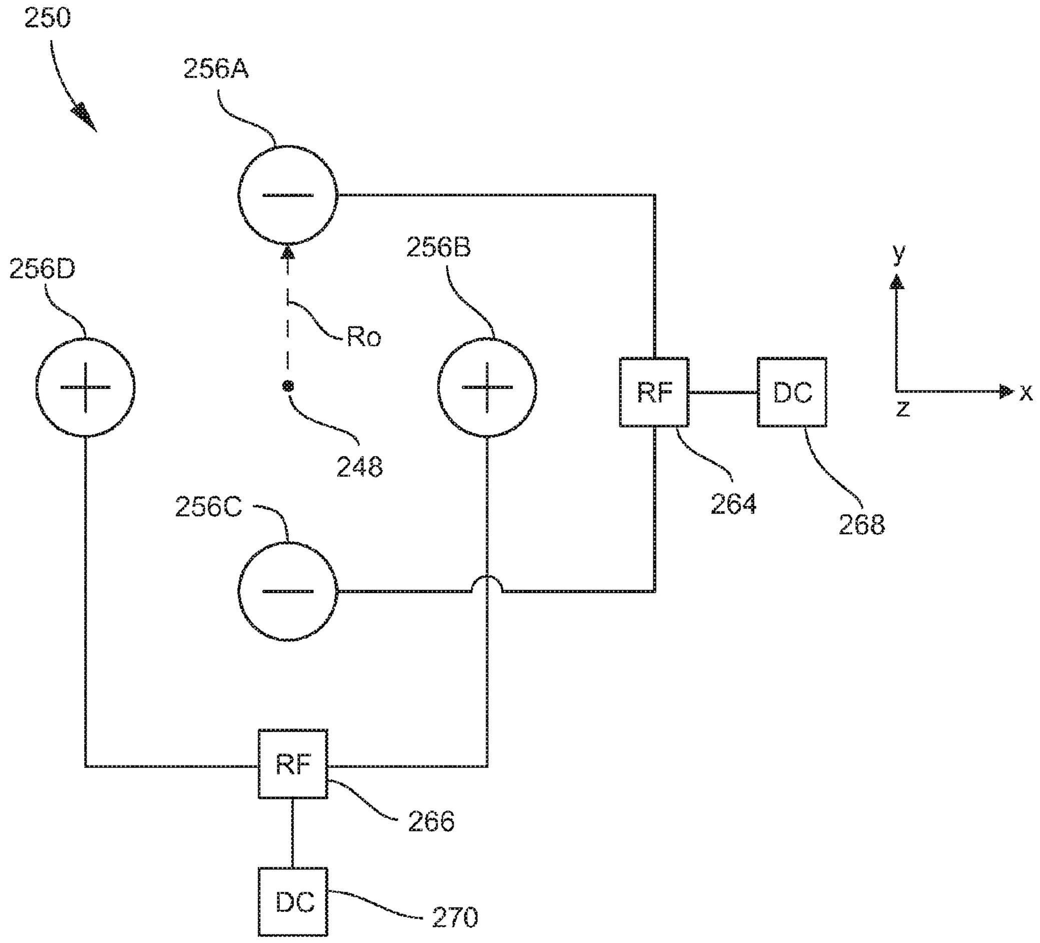
FIG. 2B is a schematic cross-sectional view of the quadrupole ion guide illustrated in FIG. 2A in the transverse (x-y) plane, taken along line B-B of FIG. 2A.

FIG. 2A is a schematic side (lengthwise) view of an example of a quadrupole ion guide assembly 200 according to some embodiments. For descriptive purposes, FIG. 2A includes a Cartesian frame of reference consisting of mutually orthogonal x-, y-, and z-axes, which may also be referred to as x-, y-, and z-directions. The z-axis corresponds to an ion guide axis 248 along which ions flow (the horizontal axis in FIG. 2A), which typically is a central axis of symmetry of the ion guide assembly 200. The x- and y-axes lie in a transverse (x-y) plane orthogonal to the ion guide axis 248. FIG. 2A is a view in the y-z plane. The quadrupole ion guide assembly 200 may generally include a quadrupole ion guide 250 and at least one (first) field terminator 252. FIG. 2B is a schematic cross-sectional view of the quadrupole ion guide 250 in the transverse (x-y) plane, taken along line B-B.

The quadrupole ion guide 250 includes four ion guide electrodes 256A, 256B, 256C, and 256D elongated along the ion guide axis 248 and spaced from each other about the ion guide axis 248 in the transverse plane. By this configuration, the ion guide electrodes 256A, 256B, 256C, and 256D surround an axially elongated ion guide volume of inscribed radius $R_0$ in which ions may be radially confined. The ion guide electrodes 256A, 256B, 256C, and 256D extend between two opposing axial ends, i.e., from an ion entrance end 258 leading into the guide volume to an ion exit end 260 leading out from the guide volume. In the illustrated embodiment, the ion guide electrodes 256A, 256B, 256C, and 256D are arranged as a quadrupole comprising a first diametrically opposing pair of electrically interconnected ion guide electrodes 256A and 256C (or "Y" electrodes), and a second diametrically opposing pair of electrically interconnected ion guide electrodes 256B and 256D (or "X" electrodes), the latter of which for clarity are not shown in FIG. 2A.

The quadrupole ion guide 250 may also include a main RF voltage source communicating with the ion guide electrodes 256A, 256B, 256C, and 256D, schematically depicted as a first main RF voltage source 264 communicating with the first opposing pair of ion guide electrodes 256A and 256C and a second main RF voltage source 266 communicating with the second opposing pair of ion guide electrodes 256B and 256D. The first RF voltage source 264 applies a first main RF potential of the general form $V_{RF,main} \cos(\Omega t-\phi_1)$ to the first opposing pair of ion guide electrodes 256A and 256C, and the second RF voltage source 266 applies a second main RF potential also of the general form $V_{RF,main} \cos(\Omega t-\phi_2)$ to the second opposing pair of ion guide electrodes 256B and 256D, where $V_{RF,main}$ is the amplitude of the RF drive potential, $\Omega$ is the main RF drive frequency, t is time, and $\phi_1$ and $\phi_2$ are the relative phases. The phase $\phi_1$ of the first main RF potential is shifted 180 degrees ($\pi$ rads) from the phase $\phi_2$ of the second main RF potential. Consequently, the ion guide electrodes 256A, 256B, 256C, and 256D generate a two-dimensional, quadrupole RF radial confining field. Between each interconnected electrode pair 256A/256C or 256B/256D, the RF confining field alternates between imparting a repelling force on the ions directed radially away from the electrode pair 256A/256C or 256B/256D and toward the ion guide axis 248, and an attractive force directed radially toward the electrode pair 256A/256C or 256B/256D and away from the ion guide axis 248.

The quadrupole ion guide 250 also typically includes a DC voltage source communicating with the ion guide electrodes 256A, 256B, 256C, and 256D, schematically depicted as a first main DC voltage source 268 communicating with the first opposing pair of ion guide electrodes 256A and 256C and a second main DC voltage source 270 communicating with the second opposing pair of ion guide electrodes 256B and 256D. The first main DC voltage source 268 applies a first main DC potential of magnitude $-U1_{DC,main}$ to the first opposing pair of ion guide electrodes 256A and 256C, and the second main DC voltage source 270 applies a second main DC potential of magnitude $+U2_{DC,main}$ to the second opposing pair of ion guide electrodes 256B and 256D. The polarity of the first main DC potential is opposite to the polarity of the second main DC potential. In FIG. 2B, the DC polarities are indicated by the signs "−" and "+" on the ion guide electrode pairs 256A/256C and 256B/256D, respectively. The negative and positive DC biases applied to the electrode pairs 256A/256C and 256B/256D are constant, i.e., they do not alternate. Consequently, the ion guide electrodes 256A, 256B, 256C, and 256D generate a quadrupole DC field in the ion guide volume. The main quadrupole DC field is superimposed on the main RF quadrupole field, resulting in a composite RF/DC confining field generated in the ion guide volume. Thus, the total potentials applied to the ion guide electrodes 256A, 256B, 256C, and 256D may be expressed as follows:

first electrode pair 256A/256C: $-(V_{RF,main}\cos(\Omega t)+U1_{DC,main})$ and second electrode pair 256B/256D: $+(V_{RF,main}\cos(\Omega t)+U2_{DC,main})$.

In some embodiments, a DC offset may be added to the quadrupole voltage such that the overall magnitude of the first main DC potential $U1_{DC,main}$ is different from the overall magnitude of the second main DC potential $U2_{DC,main}$. For example, assuming the quadrupole voltage consists of −100 V applied to the first electrode pair 256A/256C and +100 V applied to the second electrode pair 256B/256D, and further assuming a DC offset of +15V, then the overall magnitude of the first main DC potential $U1_{DC,main}$ applied to the first electrode pair 256A/256C would be −85 V and the overall magnitude of the applied to the second electrode pair 256B/256D would be +115 V.

Thus the quadrupole ion guide 250 may be configured to operate as a bandpass mass filter, in which the parameters of the RF/DC confining field $V_{RF,main}$, Ω, and $U_{DC,main}$ are controlled to determine the mass range of ions that will have stable trajectories in the RF/DC confining field, as described further below. Stable ions are able to drift through the quadrupole ion guide 250 along the ion guide axis 248 and be transmitted out from the ion exit end 260 to a downstream device, whereas unstable ions are able to oscillate far enough in the radial directions to reach the ion guide electrodes 256A, 256B, 256C, and 256D and be neutralized and thus not be transmitted out from the ion exit end 260. Alternatively, the quadrupole ion guide 250 may be configured to operate as a linear ion trap as appreciated by persons skilled in the art, by utilizing ion lenses to selectively add axial DC potential barriers at the axial ends of the quadrupole ion guide 250, and by utilizing various known techniques to selectively eject ions either axially or radially.

Figure 3:
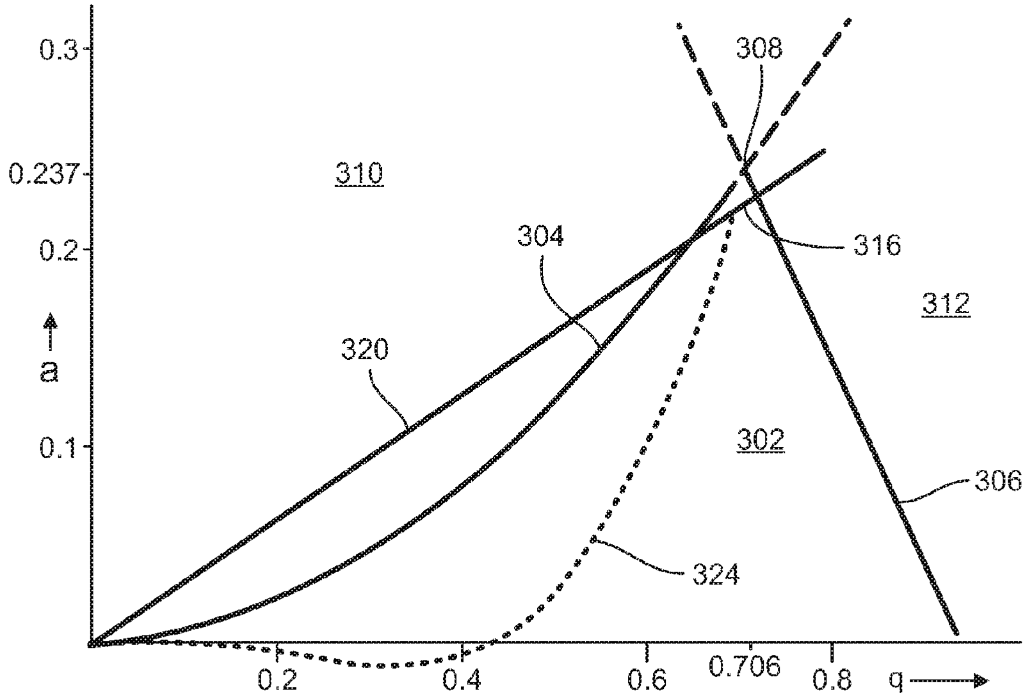
FIG. 3 is a Mathieu stability diagram illustrating the operating characteristics of a quadrupole ion guide when configured as a linear quadrupole mass analyzer (mass filter or ion trap) according to some embodiments.
Figure 4A:
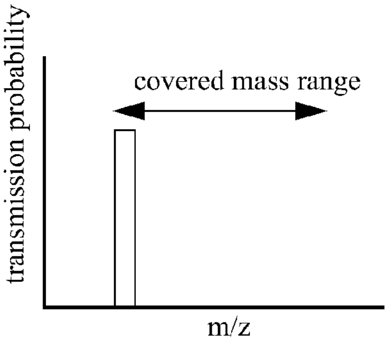
FIGS. 4A to 4D illustrate a non-limiting example of scanning U/V so as to shift a narrow m/z passband in step-wise manner, and thereby sequentially transmit a desired full mass range of interest, according to some embodiments.
Figure 4B:
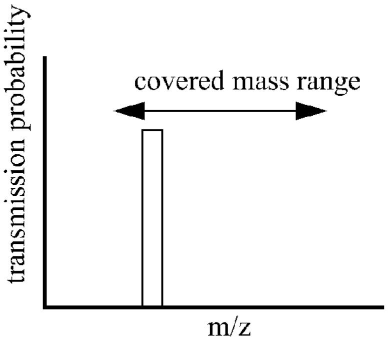
Figure 4C:
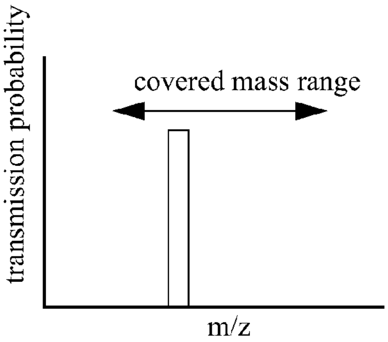
Figure 4D:
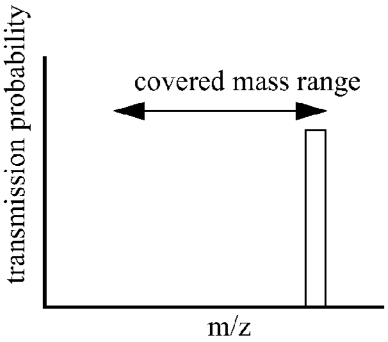

FIG. 3 is a Mathieu stability diagram illustrating the operating characteristics of the quadrupole ion guide 250 when configured as a linear quadrupole mass analyzer (mass filter or ion trap). More accurately, FIG. 3 illustrates a portion of the stability diagram containing a stability region 302 at and around which linear quadrupole devices commonly operate. The complete Mathieu stability diagram includes other stability regions not specifically shown in FIG. 3. The Mathieu stability diagram is based on a two-dimensional space defined by a horizontal q-axis and a vertical a-axis. The Mathieu operating parameters a and q may be expressed as:

$$a = \frac{8zU}{mR_0^2\Omega^2}$$

and $$q = \frac{4zV}{mR_0^2\Omega^2},$$

where U is the magnitude of the DC voltage applied to the quadrupole set of ion guide electrodes 256A, 256B, 256C, and 256D, V is the amplitude of the RF voltage applied to the ion guide electrodes 256A, 256B, 256C, and 256D, $R_0$ is the radius from ion guide axis 248 of the ion guide volume inscribed by the ion guide electrodes 256A, 256B, 256C, and 256D, Ω is the main drive frequency of the RF voltage, and m/z is the mass-to-charge ratio of an ion in question.

It is seen that the values for a and q are directly proportional to U and V, respectively, and both of the values for a and q inversely proportional to m/z, $R_0$ squared, and Ω squared. Moreover, for a given ion (m/z) and with $R_0$ fixed by geometry and Ω typically also fixed (constant) in operation, the values for a and q are dictated solely by the values set for U and V. The stability region 302 is a pseudo-triangular area bounded by the q-axis on the bottom, a curved boundary line 304 on the left, and a slightly curved, oblique boundary line 306 on the right, with the curved boundary line 304 and oblique boundary line 306 intersecting at an apex 308 where q≈0.706 and a≈0.237. Ions mapped to spaces outside the stability region 302 have unstable trajectories and consequently will be lost at some point along the axial length of the quadrupole ion guide 250. Specifically, the motion of ions mapped to a space 310 to the left of and above the curved boundary line 304 will be stable in the x-direction but not in the y-direction. The motion of ions mapped to a space 312 to the right of and above the oblique boundary line 306 will be stable in the y-direction but not in the x-direction. On the other hand, the motion of ions mapped inside the stability region 302 will be stable in both the x- and y-directions and consequently are able to the transmitted through the full length of the quadrupole ion guide 250.

With $R_0$ and Ω fixed, U and V can be set such that ions of all masses are located on an operating line (or scan line) 320, with the lower masses lying on the upper right portion of the operating line 320 and the higher masses lying on the lower left portion of the operating line 320 (given that m/z is inversely proportional to U and V). The slope of the operating line 320 is the ratio a/q, or 2U/V, which is thus independent of m/z, $R_0$, and Ω. As shown in FIG. 3, U and V can be set such that the operating line 320, specifically a short section 316 thereof, passes through only a small portion of the stability region 302 just below the apex 308. Under these conditions, only a single ion mass or a very narrow range of masses (a subset of the full mass range of ions transmitted to the quadrupole ion guide 250) are stable and able to be transmitted through the quadrupole ion guide 250. In this way, the quadrupole ion guide 250 may be operated as a bandpass mass filter, i.e., a combination of a high-pass mass filter in the x-z plane and low-pass mass filter in the y-z plane. The short section 316 of the operating line 320 occupying the stability region 302 just below the apex 308 corresponds to the narrow m/z passband provided by the mass filter. The m/z passband may be widened by reducing the value of the ratio U/V, which would have the effect of pivoting the operating line 320 clockwise such that the section 316 passes through a wider part of the stability region 302. Widening the m/z passband would lower the resolution but increase the instrument sensitivity as more ions would be transmitted.

Further, the quadrupole ion guide 250 may be operated in a mass scanning mode by increasing (scanning) U and V together in generally constant proportion (i.e., without changing the value of the ratio U/V) such that ions of successively higher masses move along the operating line 320 into the small portion of the stability region 302 just below the apex 308. That is, by scanning the ratio U/V in generally constant proportion, ions of successively higher masses become stable in both the x- and y-directions and hence able to successfully reach the ion exit end 260 and be transmitted to a downstream device. By "generally" is meant that in practice, when scanning the ratio U/V a small adjustment (e.g., <1%) may be in the U/V ratio to keep the mass peak widths constant. Otherwise, the mass resolution ($\Delta M/M$) would be constant but the peaks would increase with increasing mass.

FIGS. 4A to 4D illustrate a non-limiting example of scanning the ratio U/V so as to shift a narrow m/z passband in step-wise manner, and thereby sequentially transmit a desired full mass range of interest. Specifically FIGS. 4A to 4D are a set of plots of the narrow m/z passband, represented as transmission probability as a function of m/z ratio, at different iterations of the scanning process. In each of FIGS. 4A to 4D, the horizontal, double-headed arrow spans the extent of the total mass range of ions that may be sequentially transmitted by the quadrupole ion guide 250. In this example, the voltage parameters are adjusted so as to successively shift the m/z passband from lower masses (or mass ranges) to higher masses (or mass ranges).

As noted earlier, fringe fields at the finite axial ends of a linear quadrupole device will cause ion orbits to be unstable as they pass through the region of the fringe field. At the ion entrance end of the linear quadrupole device, the instability caused by the fringe field may result in an ion failing to enter the ion guide volume of the linear quadrupole device, even when the U/V ratio is set such that the ion's mass falls within the stability region 302. Referring to FIG. 3, an ion entering the linear quadrupole device from a field-free region outside will cross through an unstable field region (space 310) corresponding to the section of the operating line 320 that is to the left of the curved boundary line 304. Likewise, at the ion exit of the linear quadrupole device, the instability may result in the ion failing to exit the linear quadrupole device in a stable, focused manner.

Referring back to FIG. 2A, the problem with ion transmission into the quadrupole ion guide 250 is addressed by providing a field terminator 252 at the ion entrance end 258. In some embodiments, the field terminator 252 includes a quadrupole lens 274. The quadrupole lens 274 is further illustrated in FIG. 2C, which is a schematic cross-sectional view of the quadrupole lens 274 in the transverse (x-y) plane, taken along line C-C. The quadrupole lens 274 includes four electrically conductive plates (or plate electrodes) 276A, 276B, 276C, and 276D positioned at a radial distance from the guide axis 248 and spaced from each other around the guide axis 248 in the transverse plane. By this configuration, the plates 276A, 276B, 276C, and 276D surround an axially thin space around the guide axis 248 through which ions may be transmitted into the ion entrance end 258. The number of plates 276A, 276B, 276C, and 276D provided may be the same as the number of ion guide electrodes 256A, 256B, 256C, and 256D. Accordingly, in the present embodiment there are four plates 276A, 276B, 276C, and 276D. Each plate 276A, 276B, 276C, and 276D is axially aligned with a respective one of the guide electrodes 256A, 256B, 256C, and 256D. The plates 276A, 276B, 276C, and 276D are positioned at an axial distance from the ion entrance end 258, i.e., from the axial ends of the respective ion guide electrodes 256A, 256B, 256C, and 256D. Generally, this axial distance should be large enough to prevent the formation of arcs or discharges while small enough to be effective for field termination. Typically, the axial distance is a small fraction of the quadrupole size ($R_0$). For example, the axial distance may be a small number of millimeters (e.g., less than 10 mm) or a fraction of one millimeter. In the illustrated embodiment, the plates 276A, 276B, 276C, and 276D are arranged as a quadrupole comprising a first opposing pair of electrically interconnected plates 276A and 276C ("Y" plates), and a second opposing pair of electrically interconnected plates 276B and 276D ("X" plates), the latter of which for clarity are not shown in FIG. 2A. The radial distance from the guide axis 248 at which the plates 276A, 276B, 276C, and 276D are positioned may be the same (or substantially the same) as that of the ion guide electrodes 256A, 256B, 256C, and 256D (inscribed radius $R_0$), or may be greater or less than $R_0$.

In the context of the present disclosure, a "plate" has two opposing outer surfaces lying generally parallel to each other and adjoined by an outer edge. The two opposing outer surfaces each have a cross-sectional area in a plane, and the outer edge defines the thickness of the plate in the direction orthogonal to the plane of the two opposing outer surfaces. A plate is predominantly a planar, or two-dimensional, object. That is, the size of the plate is predominantly defined by the cross-sectional area of its two opposing outer surfaces rather than its thickness. For example, the thickness of the plate is less than the characteristic dimension of the cross-sectional area of its two opposing outer surfaces. In the present context, the "characteristic dimension" is a dimension that defines the cross-sectional area in manner appropriate for the shape of the cross-sectional area. As examples, the characteristic dimension may be diameter for a circle, major axis for an ellipse, or the distance between two opposing edges for a polygon (or length or width in the case of a rectangle or square). In the case of a circular cross-section, a plate may be characterized as being coin-shaped or disk-shaped.

Referring to FIG. 2A, the plates 276A, 276B, 276C, and 276D each have a characteristic dimension in the transverse (x-y) plane, and a thickness in a direction along the guide axis 248 less than the characteristic dimension. For example, the thickness may be a small number of millimeters (e.g., less than 10 mm) or a fraction of one millimeter. Typically, the thickness is less than the radial distance $R_0$. In some embodiments, the thickness is in a range from 10% to 50% of the radial distance $R_0$. In practice, the radius $R_0$ of a quadrupole mass analyzer or mass filter is typically about 10 mm or less. The geometry and size of the plates 276A, 276B, 276C, and 276D thus may be distinguished from the elongated rod-type geometry and size of the ion guide electrodes 256A, 256B, 256C, and 256D, as well as from the rods of the Brubaker lens which have a length in the direction of the guide axis 248 that is significantly greater than the characteristic dimension of their cross-sections in the transverse plane. For example, the axial length of a Brubaker lens is often specified to be three to four times the radius $R_0$, so the length is 15-20 mm for a mass filter having a typical radius $R_0$=5 mm.

In typical embodiments, the shape and characteristic dimension of the cross-section of the plates 276A, 276B, 276C, and 276D is the same (or substantially the same) as the shape and characteristic dimension of the cross-section of the ion guide electrodes 256A, 256B, 256C, and 256D. However, due to the relative thinness of the plates 276A, 276B, 276C, and 276D, their influence on the electric field due to their structural presence is minimal such that their shape and characteristic dimension need not be exactly the same as the shape and characteristic dimension of the cross-section of the ion guide electrodes 256A, 256B, 256C, and 256D. The shape of the cross-section of the ion guide electrodes 256A, 256B, 256C, and 256D (and the plates 276A, 276B, 276C, and 276D) may generally be circular, elliptical, or polygonal. In some embodiments, the side or portion of the outer edge of the ion guide electrodes 256A, 256B, 256C and 256D facing the guide axis 248 is hyperbolic-shaped so as to generate a more ideal quadrupole confining field in the ion guide volume, as appreciated by persons skilled in the art. In such case, the plates 276A, 276B, 276C, and 276D may likewise be hyperbolic-shaped, or alternatively may have a more circular, elliptical, or polygonal shape.

Figure 2C:
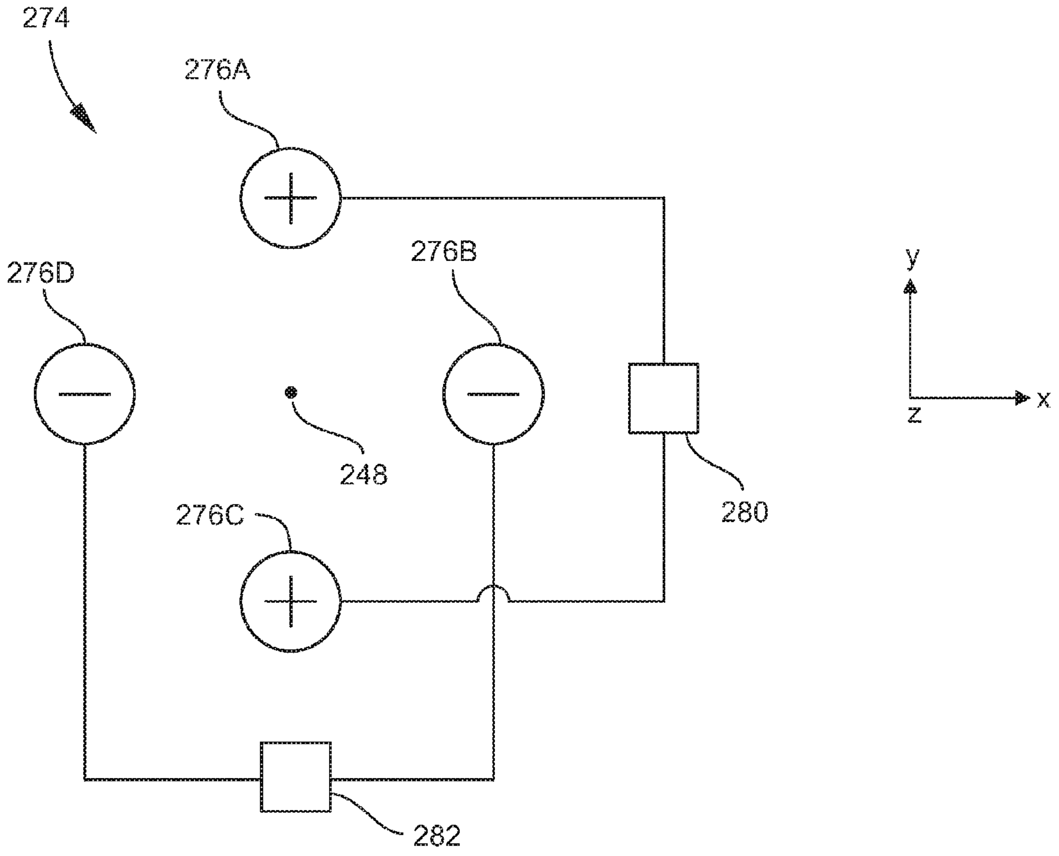
FIG. 2C is a schematic cross-sectional view of a quadrupole lens in the transverse (x-y) plane, taken along line C-C of FIG. 2A, according to some embodiments.

In some embodiments a DC voltage source, such as the DC voltage source associated with the quadrupole ion guide 250, applies DC potentials to the plates 276A, 276B, 276C, and 276D. FIG. 2C schematically depicts this as a first auxiliary DC voltage source 280 communicating with the first opposing pair of plates 276A and 276C and a second auxiliary DC voltage source 282 communicating with the second opposing pair of plates 276B and 276D. The first auxiliary DC voltage source 280 applies a first auxiliary DC potential of magnitude $+U1_{DC,aux}$ to the first opposing pair of plates 276A and 276C, and the second auxiliary DC voltage source 282 applies a second auxiliary DC potential of magnitude $-U2_{DC,aux}$ to the second opposing pair of plates 276B and 276D. The polarity of the first auxiliary DC potential is opposite to the polarity of the second auxiliary DC potential. In FIG. 2C, the DC polarities are indicated by the signs "+" and "−" on the plate pairs 276A/276C and 276B/276D, respectively. Consequently, the plates 276A, 276B, 276C, and 276D generate an auxiliary quadrupole DC field in the thin space surrounded thereby.

According to an embodiment, the auxiliary quadrupole DC field is opposite in polarity to the main quadrupole DC field generated by the ion guide electrodes 256A, 256B, 256C, and 256D, as is seen by comparing FIG. 2C with FIG. 2B. That is, the polarity of the auxiliary DC potential on each plate 276A, 276B, 276C, and 276D is opposite to the polarity of the main DC potential on the ion guide electrode 256A, 256B, 256C, and 256D with which that plate 276A, 276B, 276C, and 276D is axially aligned. For example, if the polarity on the plate 276A is positive (FIG. 2C) then the polarity on the corresponding (axially aligned) ion guide electrode 256A is negative (FIG. 2B), as well as the adjacent plates 276B and 276D being negative. Likewise, the polarity on the plate 276B is negative while the polarity on the corresponding ion guide electrode 256B is positive, and so on.

As a result of applying the auxiliary quadrupole DC field in opposite polarity to the main quadrupole DC field, the magnitude of the overall DC quadrupole field is quickly and significantly reduced and, depending on the magnitude of the auxiliary quadrupole DC field, quickly drops to zero, at or near the center of the quadrupole lens 274. In addition, the quadrupole lens 274 and its auxiliary quadrupole DC field establish fringe field conditions outside of the entrance end 258 of the quadrupole ion guide 250 that may be significantly more stable than has been achievable by known approaches due at least in part by the reduced DC field component, or at least is as stable as known approaches but which is achieved in a much axially thinner space. Consequently, all or at least most ions experience a more stable transition into the quadrupole ion guide 250 and are better focused into the ion entrance end 258, providing less opportunity for ions to diverge away from the guide axis 248 in unstable trajectories. Consequently, with the quadrupole lens 274 ions are successfully transmitted into the quadrupole ion guide 250 with greater efficiency. Moreover, all of these advantages are obtained in a much smaller axial space (much shorter transition region) as compared to known approaches. This reduced space or size may result in further improvements in performance and/or cost reductions. Another advantage is that RF potentials do not need to be applied the plates 276A, 276B, 276C, and 276D, which means neither coupling capacitors to the RF voltage source nor blocking resistors to the DC voltage source are required. Thus, the plates 276A, 276B, 276C, and 276D may be electrically coupled to a DC voltage source without being electrically coupled to the RF voltage source. This, coupled with the lower total capacitance, means that a lens driver can reverse the DC polarity of the thin plates 276A, 276B, 276C, and 276D much faster than known lens designs, which is an advantage for fast positive-to-negative switching (done, for example, to process negative ions).

As noted above, if no field termination were present, an ion entering a linear quadrupole device from a field-free region outside would cross through the unstable space 310 shown in FIG. 3 on its way into the quadrupole device. The known Brubaker design avoids this by adding a pre-filter with the DC field set to zero but with the RF field near full strength. In that case, the ions entering the quadrupole device move along the horizontal q-axis of the Mathieu plot while in the pre-filter and then see the DC field at the end of the pre-filter and move up near the apex 308 of the stability region 302 without ever passing through an unstable region of the a-q space. The Turner-Kruger lens arrangement attempts to address the stability issue by imposing an RF field on the entrance lens to group the ions into bunches that can cross the unstable region with timing matched to an RF phase where the stability consideration is less of an issue. In contrast to these known techniques, embodiments disclosed herein create a stable entrance region by using an opposite-polarity DC quadrupole field in a thin quadrupole lens 274. The plates of the quadrupole lens 274 are thin enough that the quadrupole lens 274 does not contribute much electric field of its own at the guide axis 248, but helps to cancel the DC portion of the main quadrupole field in the transition region (i.e., the quadrupole lens 274 effects quadrupole field termination). This means that the DC field increases slower than the RF field as one moves from the outside of the quadrupole ion guide 250 to the inside. Moreover, the quadrupole lens 274 makes it easier for ions to enter the quadrupole ion guide 250 at low energy, which improves mass resolution.

FIG. 3 illustrates one non-limiting example of an operating line 324 for the quadrupole ion guide assembly 200 when the field terminator 252 is provided at the ion entrance end 258 of the quadrupole ion guide 250. As shown, ions may map onto the q-axis as they pass through the field terminator 252 due to cancellation of the DC field by the field terminator 252, resulting in U=0 and thus a=0. As the ions approach the ion entrance end 258, they may remain on or very near the q-axis due to the strength of the RF field increasing faster than the strength of the DC field, with the delay in the rise of the DC field being attributable to the field terminator 252. Hence, the ions are able to avoid the unstable space 310 as they enter the quadrupole ion guide 250, instead moving from the q-axis and up through the stability region 302 toward the apex 308. Consequently, the motions of the ions (or at least most of the ions) remain stable as they transition from outside to inside the quadrupole ion guide 250. As also illustrated in FIG. 3, in some cases depending on the strength of the opposite-polarity DC quadrupole field generated by the field terminator 252, a portion of the operating line 324 may fall below the q-axis (U<0 and thus a<0). This portion of the operating line 324 is also stable in both the x- and y-directions, as the stability region 302 has a mirror-image counterpart below the q-axis, which is not specifically shown in FIG. 3.

In some embodiments, the magnitude of the auxiliary DC potentials applied to the plates 276A, 276B, 276C, and 276D may be the same (or substantially the same) as the magnitude of the main DC potentials applied to the ion guide electrodes 256A, 256B, 256C, and 256D. In some embodiments, the DC voltage source is configured for applying the auxiliary DC potential at a magnitude in a range from 50% to 100% of a magnitude of the main DC potential. Generally, the magnitude of the auxiliary DC potentials may be set relative to the magnitude of the main DC potentials as needed for effectively terminating the DC field.

In some embodiments, a DC offset may be applied to the plates 276A, 276B, 276C, and 276D, which may be different from any DC offset applied to the ion guide electrodes 256A, 256B, 256C, and 256D. A DC offset applied to the plates 276A, 276B, 276C, and 276D becomes part of the focusing field to ensure that ions launched into the quadrupole field of the quadrupole ion guide 250 are focused at an optimum position near the entrance end 258 of the quadrupole ion guide 250. Combined with more traditional cylindrical lens elements, this can provide a complete package of ion beam formation that achieves a very efficient transfer of ions into (or out from) the quadrupole ion guide 250.

As noted above, RF potentials do not need to be actively applied to the plates 276A, 276B, 276C, and 276D, although they could be actively applied if desired. Instead, RF potentials may be allowed to be passively applied to the plates 276A, 276B, 276C, and 276D through capacitive coupling with the ion guide electrodes 256A, 256B, 256C, and 256D. In some embodiments, the amplitude of the RF potentials may be applied (actively or passively) to the plates 276A, 276B, 276C, and 276D is less than the amplitude of the RF potential applied by the RF voltage source to the ion guide electrodes 256A, 256B, 256C, and 256D but with the same phases (timing). A reduced RF voltage on the plates 276A, 276B, 276C, and 276D may provide a gradual transition in the strength of the RF field that is favorable for stability.

Although FIG. 2A depicts plates 276 whose closest spacing to the central axis approximately matches the radial spacing $R_0$ of the ion guide electrodes, the plates can be moved closer or farther from the ion axis. As the plates are moved further away from the ion axis, the DC voltage magnitudes need be increased and/or the thickness of the plates need to be increased. In some embodiments, the field terminator 252 additionally includes an aperture lens 286, shown in cross-section in FIG. 2A. The aperture lens 286 surrounds the guide axis 248 and is positioned at an axial distance from the quadrupole lens 274, such that the quadrupole lens 274 is between the aperture lens 286 and the ion guide electrodes 256A, 256B, 256C, and 256D at the ion entrance end 258. In some embodiments, the axial distance between the aperture lens 286 and the quadrupole lens 274 may be comparable to the axial distance between the quadrupole lens 274 and the ion entrance end 258. The aperture lens 286 may be any electrically conductive structure that has an aperture (or a gap) centered on the guide axis 248. Examples include, but are not limited to, a plate with an aperture, a ring- or hoop-shaped electrode, two plates lying in the transverse plane (or two half-cylinders) that are split or separated by a gap (e.g., a slot or slit) centered on the guide axis 248, etc. The aperture lens 286 may be as thin as the quadrupole lens 274 as schematically depicted in FIG. 2A, or may be thicker than the quadrupole lens 274. The aperture lens 286 may function to focus the ions on the guide axis 248 and/or accelerate the ions toward the ion entrance end 258, and/or to assist in terminating the RF field or both the RF and DC fields. For such purposes, the aperture lens 286 may be grounded (or have a zero DC potential applied thereto), or the DC voltage source may be configured for applying a DC lens potential to the aperture lens 286. The DC lens potential applied to the aperture lens 286 may be the same as or different from the auxiliary DC potential applied to the quadrupole lens 274. In some embodiments, the DC voltage source may apply a negative DC lens potential to the aperture lens 286. As one non-limiting example, the DC voltage source may apply a DC lens potential of −50 V to the aperture lens 286.

In some embodiments, the field terminator 252 includes a plurality of aperture lenses axially spaced from each other. In the embodiment illustrated in FIG. 2A, for example, the field terminator 252 includes a second aperture lens 288, shown in cross-section in FIG. 2A. The second aperture lens 288 surrounds the guide axis 248 and is positioned at an axial distance from the (first) aperture lens 286, such that the first aperture lens 286 is between the second aperture lens 288 and the quadrupole lens 274. In some embodiments, the axial distance between the second aperture lens 288 and the first aperture lens 286 may be comparable to the axial distance between the first aperture lens 286 and the quadrupole lens 274. The second aperture lens 288 may be any electrically conductive structure that has an aperture (or a gap) centered on the guide axis 248, and may be structured the same as or similar to the first aperture lens 286. The second aperture lens 288 may be as thin as the quadrupole lens 274 as schematically depicted in FIG. 2A, or may be thicker than the quadrupole lens 274. The second aperture lens 288 may function to focus the ions on the guide axis 248 and/or accelerate the ions toward the ion entrance end 258, and/or to assist in terminating the RF field or both the RF and DC fields. For such purposes, the second aperture lens 288 may be grounded (or have a zero DC potential applied thereto), or the DC voltage source may be configured for applying a (second) DC lens potential to the second aperture lens 288. The second DC lens potential applied to the second aperture lens 288 may be the same as or different from the (first) DC lens potential applied to the first aperture lens 286 and/or the auxiliary DC potential applied to the quadrupole lens 274. In some embodiments, a negative DC lens potential is applied to the first aperture lens 286 and a zero DC lens potential is applied to the second aperture lens 288 (or the second aperture lens 288 is grounded). In some embodiments, the first aperture lens 286 functions primarily to terminate the RF field and any residual DC field, and the second aperture lens 288 functions primarily to terminate any residual RF field. The inside radii of the first aperture lens 286 and second aperture lens 288 may be about the same as, or different from, the inside radii of the quadrupole lens 274 and ion guide electrodes 256A, 256B, 256C, and 256D, as needed for establishing desired electric field conditions at the ion entrance end 258.

In some embodiments, the quadrupole ion guide 250 includes the field terminator 252 at the ion entrance end 258, and another type of lens or lens assembly may be provided at the ion exit end 260. In other embodiments, the quadrupole ion guide 250 includes a field terminator at the ion exit end 260, and another type of lens or lens assembly may be provided at the ion entrance end 258.

In still other embodiments and as illustrated in FIG. 2A, the quadrupole ion guide 250 may include the (first) field terminator 252 at the ion entrance end 258 and a second field terminator 292 at the ion exit end 260. The second field terminator 292 may be structured the same as or similar to the first field terminator 252, and thus the configuration of the second field terminator 292 may be consistent with that illustrated in FIG. 2C for the example of the first field terminator 252. Accordingly, the second field terminator 292 may include a second quadrupole lens 294. The second quadrupole lens 294 includes four electrically conductive second plates positioned at a radial distance from the guide axis 248 and spaced from each other around the guide axis 248 in the transverse plane, thus surrounding an axially thin space around the guide axis 248 through which ions may be transmitted out from the ion exit end 260. Like the first plates 276A, 276B, 276C, and 276D, each second plate is axially aligned with a respective one of the ion guide electrodes 256A, 256B, 256C, and 256D. The second plates are positioned at an axial distance from the ion exit end 260, which may be the same as or different from the axial distance between the first plates 276A, 276B, 276C, and 276D and the ion entrance end 258. The radial distance from the guide axis 248 at which the second plates are positioned may be the same (or substantially the same) as that of the ion guide electrodes 256A, 256B, 256C, and 256D (inscribed radius $R_0$), or may be greater or less than $R_0$ as needed for establishing desired field conditions at the ion exit end 260. The second plates may have a size (particularly axial thickness) and shape as described above with regard to the first plates 276A, 276B, 276C, and 276D.

In the same manner as the first plates 276A, 276B, 276C, and 276D, the DC voltage source associated with the quadrupole ion guide 250 may apply DC potentials to the second plates such that the DC polarity on any given second plate is opposite to the DC polarity on the adjacent second plates on either side of the given second plate. Consequently, the second plates generate an auxiliary quadrupole DC field (quadrupole DC field in the present embodiment) in the thin space surrounded thereby. Moreover, the auxiliary quadrupole DC field generated by the second plates may be opposite in polarity to the main quadrupole DC field generated by the ion guide electrodes 256A, 256B, 256C, and 256D, as described above. That is, the polarity of the auxiliary DC potential on each second plate is opposite to the polarity of the main DC potential on the ion guide electrode 256A, 256B, 256C, and 256D with which that second plate is axially aligned. As described above, the magnitude of the auxiliary DC potentials applied to the second plates may be the same as, substantially the same as, or different from as the magnitude of the main DC potentials applied to the ion guide electrodes 256A, 256B, 256C, and 256D. Moreover, in some embodiments DC offset and/or a reduced RF voltage as described above may be applied to the second plates.

The use of the second quadrupole lens 294 to generate the auxiliary quadrupole DC field at the ion exit end 260 in opposite polarity to the main quadrupole DC field may generally provide the same or analogous functions and advantages as described above with regard to the first quadrupole lens 274. Hence, the second quadrupole lens 294 may establish favorable, more stable field conditions at the ion exit end 260 that improve ion transmission out from the quadrupole ion guide 250 and into the succeeding ion processing device, by mechanisms similar or analogous to those associated with the first quadrupole lens 274 in establishing favorable, more stable field conditions at the ion entrance end 258 that improve ion transmission into the quadrupole ion guide 250. In particular, the second quadrupole lens 294 may serve to terminate or at least significantly reduce the overall DC field and focus the ions at the ion exit end 260, which is accomplished in a much smaller axial space as compared to known approaches.

As in the case of the first field terminator 252, in some embodiments the second field terminator 292 may additionally include a third aperture lens 296, shown in cross-section in FIG. 2A. The third aperture lens 296 surrounds the guide axis 248 and is positioned at an axial distance from the second quadrupole lens 294, such that the second quadrupole lens 294 is between the third aperture lens 296 and the ion guide electrodes 256A, 256B, 256C, and 256D at the ion exit end 260. In further embodiments, the second field terminator 292 may additionally include a fourth aperture lens 298, shown in cross-section in FIG. 2A. The fourth aperture lens 298 surrounds the guide axis 248 and is positioned at an axial distance from the third aperture lens 296, such that the third aperture lens 296 is between the second quadrupole lens 294 and the fourth aperture lens 298. The third aperture lens 296 and fourth aperture lens 298 may be configured (i.e., as to geometry and/or size) the same as or similar to the first aperture lens 286 and second aperture lens 288 described above. The axial distances between the second quadrupole lens 294 and third aperture lens 296, and between the third aperture lens 296 and fourth aperture lens 298, may be the same as or different from axial distances given above with regard to the first field terminator 252. The third aperture lens 296 and fourth aperture lens 298 may generally provide the same or similar functions as described above for the first aperture lens 286 and second aperture lens 288, albeit in the context of transmitting ions out from the quadrupole ion guide 250 and terminating electric fields at the ion exit end 260. Thus, DC lens potentials may be applied to the third aperture lens 296 and/or fourth aperture lens 298, or the third aperture lens 296 and/or fourth aperture lens 298 may be grounded, as described above with regard to the first field terminator 252.

The inside radii of the second quadrupole lens 294, third aperture lens 296, and fourth aperture lens 298 may be about the same as, or different from, the inside radii of the first quadrupole lens 274, first aperture lens 286, and second aperture lens 288, respectively, as needed for establishing desired electric field conditions at the ion exit end 260. For example, in a quadrupole mass filter, the ions exiting the quadrupole ion guide 250 may occupy a much larger diameter at the ion exit end 260 than at the ion entrance end 258, in which case one or more lens elements of the second field terminator 292 may be sized larger than those of the first field terminator 252.

Figure 5:
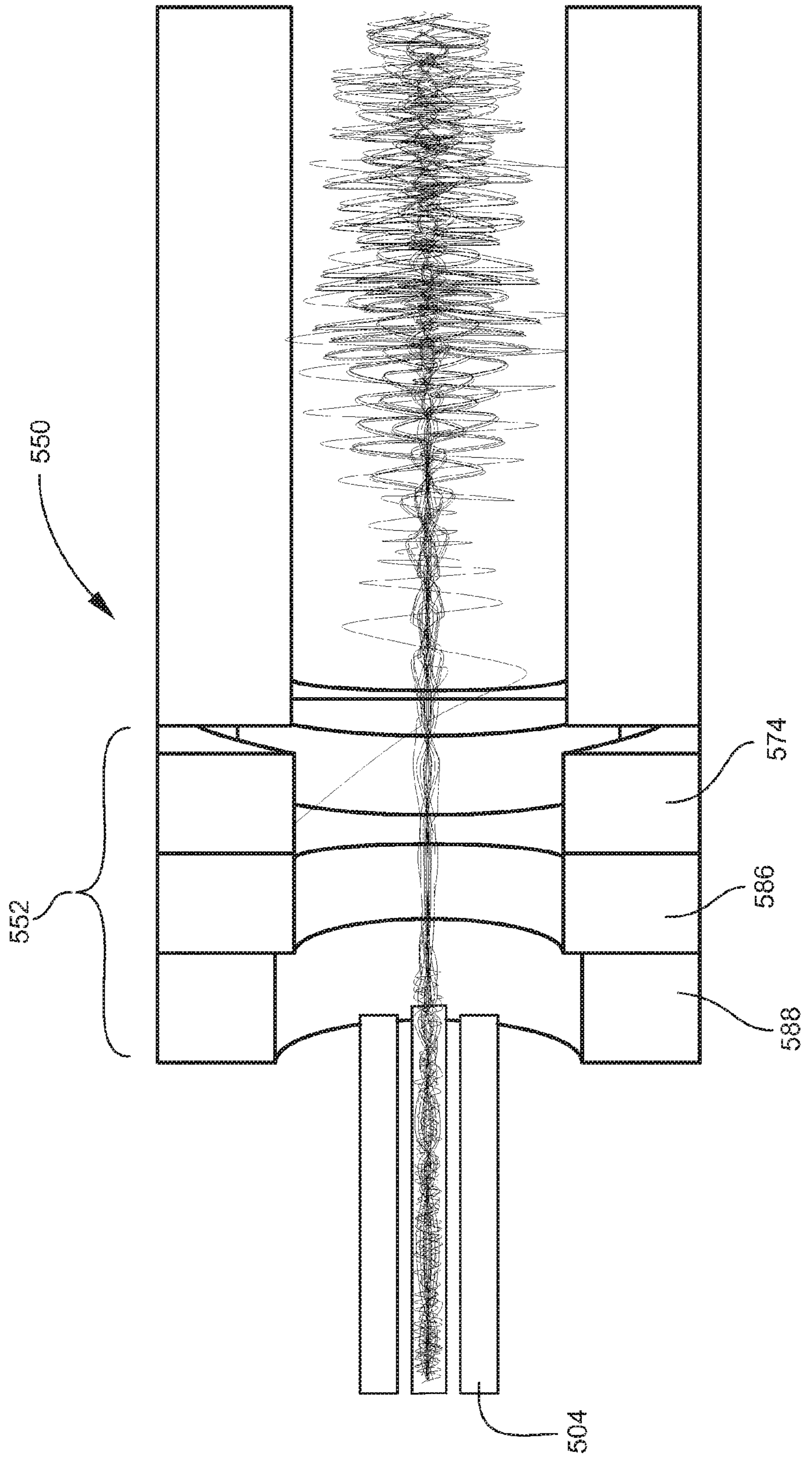
FIG. 5 is a software-generated model simulating ion motion through a quadrupole ion guide assembly according to some embodiments.

FIG. 5 is a software-generated model simulating ion motion through a quadrupole ion guide assembly 500. The quadrupole ion guide assembly 500 includes a field terminator 552 positioned as a pre-filter in front of the ion entrance end of a quadrupole mass filter 550. The field terminator 552 is configured as described above, and includes a quadrupole lens 574 upstream of the quadrupole mass filter 550, a first aperture lens 586 upstream of the quadrupole lens 574, and a second aperture lens 588 upstream of the first aperture lens 586. The model also includes an RF-only hexapole ion guide 504 upstream of the second aperture lens 588, which transmits ions into the quadrupole mass filter 550 via the field terminator 552. As shown, ions are focused near the entrance of the quadrupole mass filter 550 with few transmission losses in the field terminator 552. The first aperture lens 586 and second aperture lens 588 assist in maintaining a beam focus point within the quadrupole mass filter 550.

Embodiments have been described above primarily in a case where the quadrupole ion guide 250 is a mass filter. However, the quadrupole ion guide 250 may be any other mass analyzing device having a linear configuration, for example a linear quadrupole ion trap with radial or axial ion ejection.

Exemplary Embodiments

Exemplary embodiments provided in accordance with the presently disclosed subject matter include, but are not limited to, the following:

1. An ion guide assembly, comprising: a quadrupole ion guide comprising an entrance end, an exit end, and four guide electrodes elongated along a guide axis from the entrance end to the exit end and positioned at a radial distance from the guide axis; a quadrupole lens comprising four plates spaced from each other around the guide axis and positioned at an axial distance from the entrance end or the exit end, wherein each plate is axially aligned with a respective one of the guide electrodes; and a direct current (DC) voltage source configured for applying DC potentials to the guide electrodes and the plates effective for generating a DC quadrupolar field in the ion guide volume and terminating the DC quadrupolar field at the plates.

2. The ion guide assembly of embodiment 1, wherein: the guide electrodes comprise a first guide electrode pair spaced from each other along a first transverse axis orthogonal to the guide axis, and a second guide electrode pair spaced from each other along a second transverse axis orthogonal to the guide axis and to the first transverse axis; the plates comprise a first plate pair spaced from each other along the first transverse axis, and a second plate pair spaced from each other along the second transverse axis; and the DC voltage source is configured for: applying a first main DC potential to the first guide electrode pair, and a second main DC potential to the second guide electrode pair of opposite polarity to the first main DC potential; and applying a first auxiliary DC potential to the first plate pair, and a second auxiliary DC potential to the second plate pair of opposite polarity to the first auxiliary DC potential, wherein the polarity of the auxiliary DC potential on each plate is opposite to the polarity of the main DC potential on the guide electrode with which the plate is axially aligned.

3. The ion guide assembly of embodiment 2, wherein the quadrupole lens is a first quadrupole lens and is positioned at an axial distance from the entrance end, and further comprising: a second quadrupole lens comprising four electrically conductive plates spaced from each other around the guide axis and positioned at an axial distance from the exit end, wherein each plate is axially aligned with a respective one of the guide electrodes, the plates of the second quadrupole lens comprising a third plate pair spaced from each other along the first transverse axis, and a fourth plate pair spaced from each other along the second transverse axis, wherein: the DC voltage source is configured for applying a third auxiliary DC potential to the third plate pair, and a fourth auxiliary DC potential to the fourth plate pair of opposite polarity to the third auxiliary DC potential; and the polarity of the auxiliary DC potential on each plate of the second quadrupole lens is opposite to the polarity of the main DC potential on the guide electrode with which the plate is axially aligned.

4. The ion guide assembly of any of the preceding embodiments, wherein the DC voltage source is configured for applying DC potentials to the plates at magnitudes less than respective magnitudes applied to the guide electrodes, or at magnitudes in a range from 50% to 100% of respective magnitudes applied to the guide electrodes.

5. The ion guide assembly of any of the preceding embodiments, comprising a radio frequency (RF) voltage source configured for applying RF potentials to the guide electrodes to generate a quadrupole RF field in the guide volume.

6. The ion guide assembly of embodiment 5, wherein the plates are electrically coupled to the DC voltage source without being electrically coupled to the RF voltage source.

7. The ion guide assembly of embodiment 5 or 6, wherein the RF voltage source configured for actively or passively applying RF potentials to the plates at an amplitude less than an amplitude of the RF potential applied to the guide electrodes, or at an amplitude in a range from 0% to 50% of the amplitude of the RF potential applied to the guide electrodes.

8. The ion guide assembly of any of the preceding embodiments, wherein the guide electrodes have cross-sections in the transverse plane, and the plates have cross-sections in the transverse plane of substantially the same shape as the cross-sections of the guide electrodes.

9. The ion guide assembly of any of the preceding embodiments, wherein each plate has a characteristic dimension in the transverse plane and a thickness in a direction along the guide axis, wherein the thickness selected from the group consisting of: a thickness less than the characteristic dimension; a thickness less than the radial distance; a thickness in a range from 10% to 50% of the radial distance; and a combination of two or more of the foregoing.

10. The ion guide assembly of any of the preceding embodiments, comprising an aperture lens surrounding the guide axis and positioned at an axial distance from the quadrupole lens wherein the quadrupole lens is between the aperture lens and the guide electrodes.

11. The ion guide assembly of embodiment 10, wherein the DC voltage source is configured for applying a DC lens potential to the aperture lens, or the aperture lens is grounded.

12. The ion guide assembly of embodiment 10 or 11, wherein the aperture lens is a first aperture lens, and further comprising a second aperture lens surrounding the guide axis and positioned at an axial distance from the first aperture lens such that the first aperture lens is between the quadrupole lens and the second aperture lens.

13. The ion guide assembly of embodiment 12, wherein the second aperture lens is grounded, or DC the voltage source is configured for applying a DC potential to the second aperture lens.

14. The ion guide assembly of any of embodiments 1 or 4 to 13, wherein the quadrupole lens is a first quadrupole lens and is positioned at an axial distance from the entrance end, and further comprising: a second quadrupole lens comprising four electrically conductive plates spaced from each other around the guide axis and positioned at an axial distance from the exit end, wherein each plate is axially aligned with a respective one of the guide electrodes; and wherein the DC voltage source is configured for applying DC potentials to the plates of the second quadrupole lens effective for terminating the DC quadrupolar field at the plates of the second quadrupole lens.

15. The ion guide assembly of embodiment 14, comprising a configuration selected from the group consisting of: one or more aperture lenses surrounding the guide axis and positioned at an axial distance from the first quadrupole lens wherein the first quadrupole lens is between the guide electrodes and the one or more aperture lenses; one or more aperture lenses surrounding the guide axis and positioned at an axial distance from the second quadrupole lens wherein the second quadrupole lens is between the guide electrodes and the one or more aperture lenses; and both of the foregoing.

16. The ion guide assembly of any of the preceding embodiments, wherein the quadrupole ion guide is part of a mass filter or an ion trap.

17. A mass spectrometer (MS), comprising: the ion guide assembly of any of the preceding embodiments; and an ion detector downstream from the ion guide assembly.

18. The MS of embodiment 17, comprising a mass analyzer between the ion guide assembly and the ion detector.

19. The MS of embodiment 18, comprising an ion fragmentation device between the ion guide assembly and the mass analyzer.

20. The MS of embodiment 17, comprising an ion fragmentation device upstream of or downstream from the ion guide assembly.

21. The MS of any of embodiments 17 to 20, comprising an ion source upstream of the ion guide.

22. A method for terminating a quadrupole electrical field, the method comprising:

generating a quadrupole DC field in a quadrupole ion guide comprising four guide electrodes elongated along a guide axis from an entrance end to an exit end and positioned at a radial distance from the guide axis, by applying main DC potentials to the guide electrodes; and applying auxiliary DC potentials to four plates of a quadrupole lens, the plates being spaced from each other around the guide axis and positioned at an axial distance from the entrance end or the exit end, wherein each plate is axially aligned with a respective one of the guide electrodes, and wherein the auxiliary DC potentials are applied at magnitudes and polarities relative to the main DC potentials effective for terminating the quadrupole DC field at the plates.

23. The method of embodiment 22, wherein: the guide electrodes comprise a first guide electrode pair spaced from each other along a first transverse axis orthogonal to the guide axis, and a second guide electrode pair spaced from each other along a second transverse axis orthogonal to the guide axis and to the first transverse axis; the plates comprise a first plate pair spaced from each other along the first transverse axis, and a second plate pair spaced from each other along the second transverse axis; applying the main DC potentials comprises applying a first main DC potential to the first guide electrode pair, and a second main DC potential to the second guide electrode pair of opposite polarity to the first main DC potential; and applying the auxiliary DC potentials comprises applying a first auxiliary DC potential to the first plate pair, and a second auxiliary DC potential to the second plate pair of opposite polarity to the first auxiliary DC potential, wherein the polarity of the auxiliary DC potential on each plate is opposite to the polarity of the main DC potential on the guide electrode with which the plate is axially aligned.

24. The method of embodiment 23, wherein: the quadrupole lens is a first quadrupole lens and is positioned at an axial distance from the entrance end; a second quadrupole lens comprises four electrically conductive plates spaced from each other around the guide axis and positioned at an axial distance from the exit end, wherein each plate is axially aligned with a respective one of the guide electrodes, the plates of the second quadrupole lens comprising a third plate pair spaced from each other along the first transverse axis, and a fourth plate pair spaced from each other along the second transverse axis; and the method further comprises: applying a third auxiliary DC potential to the third plate pair, and a fourth auxiliary DC potential to the fourth plate pair of opposite polarity to the third auxiliary DC potential, wherein the polarity of the auxiliary DC potential on each plate of the second quadrupole lens is opposite to the polarity of the main DC potential on the guide electrode with which the plate is axially aligned.

25. The method of any of embodiments 22 to 24, wherein each plate has a characteristic dimension in the transverse plane and a thickness in a direction along the guide axis, wherein the thickness selected from the group consisting of: a thickness less than the characteristic dimension; a thickness less than the radial distance; a thickness in a range from 10% to 50% of the radial distance; and a combination of two or more of the foregoing.

26. The method of any of embodiments 22 to 25, comprising transmitting ions in a direction along the guide axis through a space surrounded by the plates, and into the entrance end or out from the exit end.

27. The method of any of embodiments 22 to 26, comprising applying the auxiliary DC potentials at magnitudes less than magnitudes at which the main DC potentials are applied, or at magnitudes in a range from 50% to 100% of magnitudes at which the main DC potentials are applied.

28. The method of any of embodiments 22 to 27, comprising generating a quadrupole RF field in a quadrupole ion guide applying RF potentials to the guide electrodes.

29. The method of embodiment 28, comprising actively or passively applying RF potentials to the plates at an amplitude less than an amplitude of the RF potentials applied to the guide electrodes, or at an amplitude in a range from 0% to 50% of the amplitude of the RF potential applied to the guide electrodes.

30. The method of any of embodiments 22 to 29, wherein an aperture lens surrounds the guide axis and is positioned at an axial distance from the plates such that the plates are between the aperture lens and the guide electrodes, and further comprising applying a DC lens potential to the aperture lens or grounding the aperture lens.

31. The method of embodiment 30, wherein the aperture lens is a first aperture lens, and a second aperture lens surrounds the guide axis and is positioned at an axial distance from the first aperture lens such that the first aperture lens is between the plates and the second aperture lens, and further comprising applying a DC potential to the second aperture lens or grounding the second aperture lens.

32. The method of any of embodiments 22 to 31, comprising mass-filtering or mass-analyzing the ions in the guide volume.

33. An ion guide assembly configured for performing the method of any of the above embodiments.

It will be understood that phrases such as "electrically communicate," "in signal communication," and the like as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. An ion guide assembly, comprising:

a quadrupole ion guide comprising an entrance end, an exit end, and four guide electrodes elongated along a guide axis from the entrance end to the exit end and positioned at a radial distance from the guide axis;

a quadrupole lens comprising four plates spaced from each other around the guide axis and positioned at an axial distance from the entrance end or the exit end, wherein each plate is axially aligned with a respective one of the guide electrodes; and a direct current (DC) voltage source configured for applying DC potentials to the guide electrodes and the plates effective for generating a DC quadrupolar field in the ion guide volume and terminating the DC quadrupolar field at the plates.

2. The ion guide assembly of claim 1, wherein:

the guide electrodes comprise a first guide electrode pair spaced from each other along a first transverse axis orthogonal to the guide axis, and a second guide electrode pair spaced from each other along a second transverse axis orthogonal to the guide axis and to the first transverse axis;

the plates comprise a first plate pair spaced from each other along the first transverse axis, and a second plate pair spaced from each other along the second transverse axis; and the DC voltage source is configured for:

applying a first main DC potential to the first guide electrode pair, and a second main DC potential to the second guide electrode pair of opposite polarity to the first main DC potential; and applying a first auxiliary DC potential to the first plate pair, and a second auxiliary DC potential to the second plate pair of opposite polarity to the first auxiliary DC potential, wherein the polarity of the auxiliary DC potential on each plate is opposite to the polarity of the main DC potential on the guide electrode with which the plate is axially aligned.

3. The ion guide assembly of claim 1, wherein the DC voltage source is configured for applying DC potentials to the plates at magnitudes less than respective magnitudes applied to the guide electrodes, or at magnitudes in a range from 50% to 100% of respective magnitudes applied to the guide electrodes.

4. The ion guide assembly of claim 1, comprising a radio frequency (RF) voltage source configured for applying RF potentials to the guide electrodes to generate a quadrupole RF field in the guide volume.

5. The ion guide assembly of claim 4, wherein the plates are electrically coupled to the DC voltage source without being electrically coupled to the RF voltage source.

6. The ion guide assembly of claim 4, wherein the RF voltage source configured for actively or passively applying RF potentials to the plates at an amplitude less than an amplitude of the RF potential applied to the guide electrodes, or at an amplitude in a range from 0% to 50% of the amplitude of the RF potential applied to the guide electrodes.

7. The ion guide assembly of claim 1, wherein each plate has a characteristic dimension in the transverse plane and a thickness in a direction along the guide axis, wherein the thickness selected from the group consisting of: a thickness less than the characteristic dimension; a thickness less than the radial distance; a thickness in a range from 10% to 50% of the radial distance; and a combination of two or more of the foregoing.

8. The ion guide assembly of claim 1, comprising an aperture lens surrounding the guide axis and positioned at an axial distance from the quadrupole lens wherein the quadrupole lens is between the aperture lens and the guide electrodes.

9. The ion guide assembly of claim 8, wherein the DC voltage source is configured for applying a DC lens potential to the aperture lens, or the aperture lens is grounded.

10. The ion guide assembly of claim 8, wherein the aperture lens is a first aperture lens, and further comprising a second aperture lens surrounding the guide axis and positioned at an axial distance from the first aperture lens such that the first aperture lens is between the quadrupole lens and the second aperture lens.

11. The ion guide assembly of claim 10, wherein the second aperture lens is grounded, or DC the voltage source is configured for applying a DC potential to the second aperture lens.

12. The ion guide assembly of claim 1, wherein the quadrupole lens is a first quadrupole lens and is positioned at an axial distance from the entrance end, and further comprising:

a second quadrupole lens comprising four electrically conductive plates spaced from each other around the guide axis and positioned at an axial distance from the exit end, wherein each plate is axially aligned with a respective one of the guide electrodes; and wherein the DC voltage source is configured for applying DC potentials to the plates of the second quadrupole lens effective for terminating the DC quadrupolar field at the plates of the second quadrupole lens.

13. The ion guide assembly of claim 12, comprising a configuration selected from the group consisting of:

one or more aperture lenses surrounding the guide axis and positioned at an axial distance from the first quadrupole lens wherein the first quadrupole lens is between the guide electrodes and the one or more aperture lenses;

one or more aperture lenses surrounding the guide axis and positioned at an axial distance from the second quadrupole lens wherein the second quadrupole lens is between the guide electrodes and the one or more aperture lenses; and both of the foregoing.

14. A mass spectrometer (MS), comprising:

the ion guide assembly of claim 1; and an ion detector downstream from the ion guide assembly.

15. A method for terminating a quadrupole electrical field, the method comprising:

generating a quadrupole DC field in a quadrupole ion guide comprising four guide electrodes elongated along a guide axis from an entrance end to an exit end and positioned at a radial distance from the guide axis, by applying main DC potentials to the guide electrodes; and applying auxiliary DC potentials to four plates of a quadrupole lens, the plates being spaced from each other around the guide axis and positioned at an axial distance from the entrance end or the exit end, wherein each plate is axially aligned with a respective one of the guide electrodes, and wherein the auxiliary DC potentials are applied at magnitudes and polarities relative to the main DC potentials effective for terminating the quadrupole DC field at the plates.

16. The method of claim 15, wherein:

the guide electrodes comprise a first guide electrode pair spaced from each other along a first transverse axis orthogonal to the guide axis, and a second guide electrode pair spaced from each other along a second transverse axis orthogonal to the guide axis and to the first transverse axis;

the plates comprise a first plate pair spaced from each other along the first transverse axis, and a second plate pair spaced from each other along the second transverse axis;

applying the main DC potentials comprises applying a first main DC potential to the first guide electrode pair, and a second main DC potential to the second guide electrode pair of opposite polarity to the first main DC potential; and applying the auxiliary DC potentials comprises applying a first auxiliary DC potential to the first plate pair, and a second auxiliary DC potential to the second plate pair of opposite polarity to the first auxiliary DC potential, wherein the polarity of the auxiliary DC potential on each plate is opposite to the polarity of the main DC potential on the guide electrode with which the plate is axially aligned.

17. The method of claim 15, wherein each plate has a characteristic dimension in the transverse plane and a thickness in a direction along the guide axis, wherein the thickness selected from the group consisting of: a thickness less than the characteristic dimension; a thickness less than the radial distance; a thickness in a range from 10% to 50% of the radial distance; and a combination of two or more of the foregoing.

18. The method of claim 15, comprising applying the auxiliary DC potentials at magnitudes less than magnitudes at which the main DC potentials are applied, or at magnitudes in a range from 50% to 100% of magnitudes at which the main DC potentials are applied.

19. The method of claim 15, comprising:

generating a quadrupole RF field in a quadrupole ion guide applying RF potentials to the guide electrodes; and actively or passively applying RF potentials to the plates at an amplitude less than an amplitude of the RF potentials applied to the guide electrodes, or at an amplitude in a range from 0% to 50% of the amplitude of the RF potential applied to the guide electrodes.

20. The method of claim 15, comprising applying one or more DC lens potentials to one or more respective aperture lenses, wherein the one or more aperture lenses are positioned at one or more axial distances from the plates such that the plates are between the one or more aperture lenses and the guide electrodes.

* * * * *